UNITED STATES PATENT OFFICE.

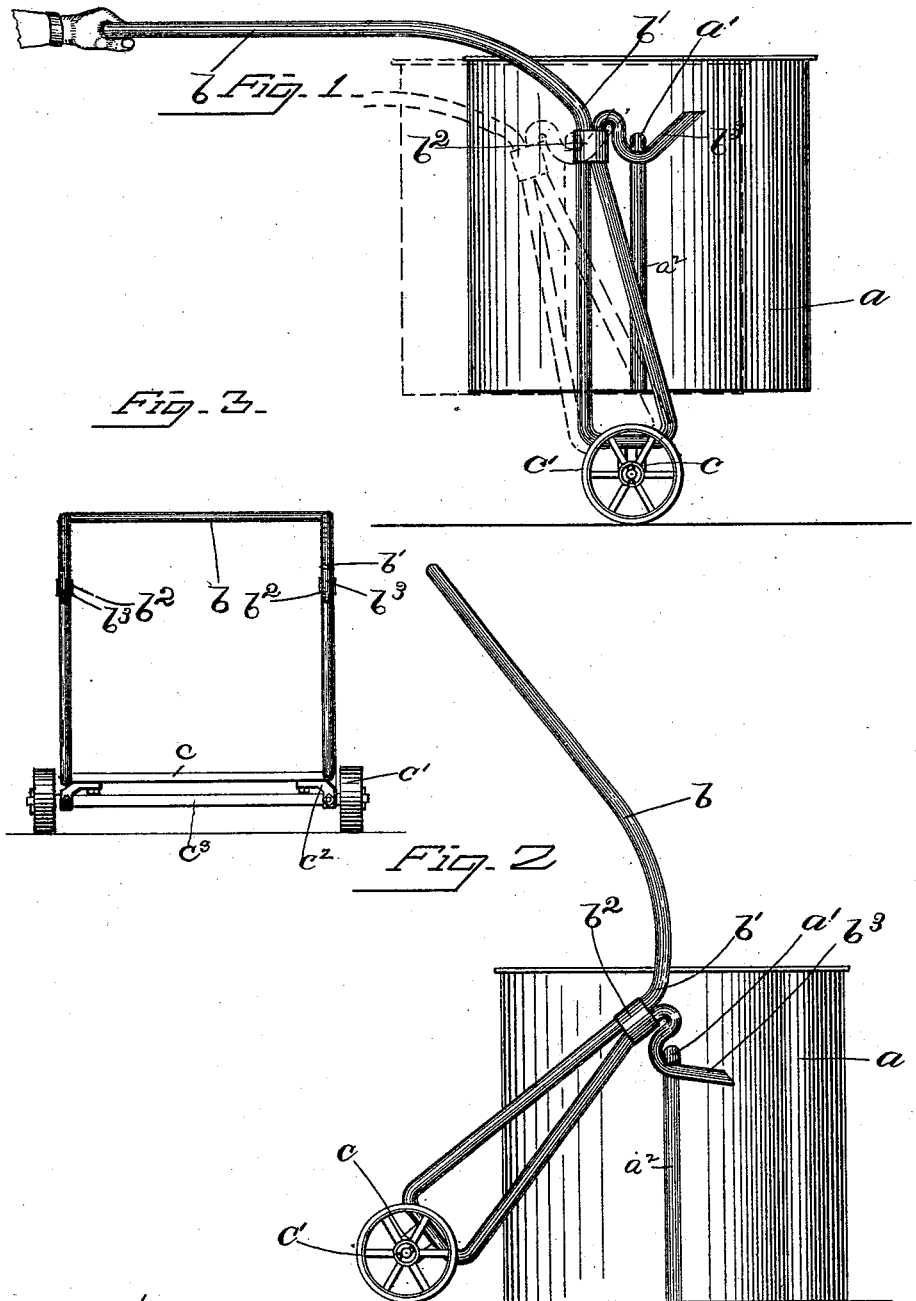

THOMAS R. CAMPBELL, OF CAMBRIDGE, MASSACHUSETTS.

TRUCK.

SPECIFICATION forming part of Letters Patent No. 517,642, dated April 3, 1894.

Application filed July 15, 1893. Serial No. 480,557. (No model.)

*To all whom it may concern:*

Be it known that I, THOMAS R. CAMPBELL, of Cambridge, county of Middlesex, State of Massachusetts, have invented an Improvement in Trucks, of which the following description, in connection with the accompanying drawings, is a specification, like letters on the drawings representing like parts.

This invention has for its object to improve the construction of trucks or carriers for ash barrels and other receptacles.

In accordance with this invention the truck consists of an open frame comprising two like side pieces, bent at suitable points between their ends at right angles or substantially so, the lower ends of said side pieces being connected to an axle or frame which supports at each end a wheel, and the upper ends of said side pieces being joined together to form a handle by means of which the truck may be moved from place to place. Upon each side piece at or near the point where the pieces bend, suitable hooks are provided which are adapted to engage lugs or ears or other projections formed upon or projecting from the sides of the ash barrel or other receptacle. The frame of the truck being open or bent in this manner, and provided with hooks at the bends, permits it to be turned so that it may approach and engage the ash barrel, which may be resting upon the ground or floor, and thereafter by turning it down to raise said barrel, so that it may be conveyed from place to place.

Figure 1, shows in side elevation a truck or carrier for ash barrels and the like, embodying this invention; Fig. 2, a similar view showing the truck in position to engage the barrel resting upon the ground or floor, and Fig. 3, an end view of the frame on a smaller scale.

The barrel $a$, is provided upon each side with lugs or ears $a'$ made slightly hook-shaped and projecting outwardly a suitable distance, or any other form of projection may be placed on said barrel. The lugs $a'$ are herein shown as formed upon the upper ends of vertical rods or bars $a^2$, which are secured to the outer sides of the receptacle and serve as braces therefor.

The truck or carrier consists of an open frame comprising like side pieces $b$, $b$, bent at points about midway between their ends as at $b'$, at right angles, and secured at their lower ends to an axle or frame, which supports at each end a wheel $c'$, and joined together at their upper ends to form a handle. The axle or frame which carries the wheels $c'$ is herein shown as composed of a cross bar $c$, secured to the lower ends of the side pieces, and having upon its under side, at each end hangers $c^2$, and the wheel supporting axle $c^3$ is supported by said hangers $c^2$.

The frame of the truck is herein shown as made of a single bent metallic rod or bar, and for additional strength at the lower end portions of the frame, the said rod or bar is bent upon itself as shown, and a suitable strap $b^2$, joins the parts together, but I do not desire to confine my invention in this particular, as the frame may be made of wood. Each side frame is provided with a hook $b^3$, projecting rearwardly from the point where the said frames are bent, and which are adapted to engage the lugs or ears or other projections $a'$, projecting from barrels $a$. These hooks are also herein represented as formed integral with the rod or bar composing the frame of the truck.

The bend given to the frame is sufficient to enable the frame when upturned to approach the ash barrel as shown in Fig. 2, engaging the lugs or ears thereof; and then by turning said frame down the barrel may be raised, and when so supported it may be conveyed from place to place. The barrel when so supported by the lugs or ears is free to swing on its lugs or ears, they serving as trunnions, with the frame in all its different positions, except when upturned as represented in Fig. 2.

I claim—

The receptacle $a$ having lateral projections $a'$, combined with the truck consisting of an open frame, comprising two like side pieces $b$, bent at points midway between their ends at right angles, and joined together at their upper ends by the handle bar, and an axle or frame secured to their lower ends, wheels supported at each end of said axle or frame, and hooks $b^3$ projecting from said side pieces at their bends, as shown, between the wheel supporting axle and handle bar to engage the projections $a'$, substantially as described.

In testimony whereof I have signed my name to this specification in the presence of two subscribing witnesses.

THOMAS R. CAMPBELL.

Witnesses:
B. J. NOYES,
EVA S. ROUNDS.